US008561147B2

(12) United States Patent
Lee et al.

(10) Patent No.: US 8,561,147 B2
(45) Date of Patent: Oct. 15, 2013

(54) METHOD AND APPARATUS FOR CONTROLLING OF REMOTE ACCESS TO A LOCAL NETWORK

(75) Inventors: Kyung Ju Lee, Goyang-si (KR); Yu Kyoung Song, Yongin-si (KR)

(73) Assignee: LG Electronics Inc., Seoul (KR)

( * ) Notice: Subject to any disclaimer, the term of this patent is extended or adjusted under 35 U.S.C. 154(b) by 1071 days.

(21) Appl. No.: 11/912,127

(22) PCT Filed: Apr. 19, 2006

(86) PCT No.: PCT/KR2006/001454
§ 371 (c)(1),
(2), (4) Date: Jun. 27, 2008

(87) PCT Pub. No.: WO2006/112661
PCT Pub. Date: Oct. 26, 2006

(65) Prior Publication Data
US 2008/0289009 A1    Nov. 20, 2008

Related U.S. Application Data

(60) Provisional application No. 60/673,253, filed on Apr. 19, 2005.

(30) Foreign Application Priority Data

Dec. 22, 2005    (KR) ........................ 10-2005-0128101

(51) Int. Cl.
*H04L 29/06*    (2006.01)
(52) U.S. Cl.
USPC ......... 726/4; 726/5; 726/6; 713/153; 713/155

(58) Field of Classification Search
USPC .................................. 726/4–6; 713/153, 155
See application file for complete search history.

(56) References Cited

U.S. PATENT DOCUMENTS

| 5,956,487 | A  | 9/1999  | Venkatraman et al. |
| 6,801,507 | B1 | 10/2004 | Humpleman et al. |
| 7,039,858 | B2 | 5/2006  | Humpleman et al. |
| 7,103,834 | B1 | 9/2006  | Humpleman et al. |
| 7,200,683 | B1 | 4/2007  | Wang et al. |
| 7,308,645 | B2 | 12/2007 | Humpleman et al. |

(Continued)

FOREIGN PATENT DOCUMENTS

| EP | 1043876 | 10/2000 |
| EP | 1182823 | 2/2002  |

(Continued)

*Primary Examiner* — Justin T Darrow
(74) *Attorney, Agent, or Firm* — Lee, Hong, Degerman, Kang & Waimey

(57) ABSTRACT

The present invention is to ensure security of a local network, e.g., a home network from remote access while allowing remote access. In a method of the present invention, if a device on the local network is to be accessed remotely, user identifying information (and/or device identifying information) and connection information of a target device, that are accompanied by the access, are compared with information of registered allowance entries and whether to allow the access is determined based on the comparison result. According to the method, remote access to a device invoked by a user (and/or a remote device) whose remote access is not set to allowance is blocked while remote access invoked by a user (and/or a remote device) whose remote access is set to allowance is admitted.

14 Claims, 3 Drawing Sheets

(56) References Cited

U.S. PATENT DOCUMENTS

| | | |
|---|---|---|
| 7,325,057 B2 | 1/2008 | Cho et al. |
| 7,349,967 B2 | 3/2008 | Wang |
| 7,490,293 B1 | 2/2009 | Humpleman et al. |
| 2001/0032273 A1 | 10/2001 | Cheng |
| 2003/0009537 A1* | 1/2003 | Wang .......................... 709/219 |
| 2003/0063608 A1 | 4/2003 | Moonen |
| 2003/0115326 A1 | 6/2003 | Verma et al. |
| 2003/0217136 A1* | 11/2003 | Cho et al. ..................... 709/223 |
| 2004/0006647 A1 | 1/2004 | Kim et al. |
| 2004/0016242 A1 | 1/2004 | Song et al. |
| 2004/0054747 A1 | 3/2004 | Breh et al. |
| 2004/0054789 A1 | 3/2004 | Breh et al. |
| 2004/0111490 A1 | 6/2004 | Im et al. |
| 2005/0099982 A1 | 5/2005 | Sohn et al. |
| 2006/0037036 A1 | 2/2006 | Min et al. |
| 2006/0069911 A1* | 3/2006 | Takabayashi et al. ........ 713/150 |
| 2008/0205419 A1 | 8/2008 | Shin et al. |
| 2009/0037556 A1 | 2/2009 | Kokkinen et al. |

FOREIGN PATENT DOCUMENTS

| | | |
|---|---|---|
| EP | 1345381 | 10/2006 |
| JP | 2003092636 | 3/2003 |
| JP | 2004112505 | 4/2004 |
| KR | 1020010110021 | 12/2001 |
| KR | 1020040021305 | 3/2004 |
| KR | 1020050079840 | 8/2005 |

* cited by examiner

FIG. 2a

*ConfigureExternalAccessPermission()*

| Argument | Direction | Description |
|---|---|---|
| user_id | IN | Identifier of a user to allow remote access |
| UDN | IN | UDN of a device to allow remote access |
| Permission | IN | enable or disable remote access |

FIG. 2b

| User ID (or credential) | Remote Access Enabled Devices |
|---|---|
| Kalen | e99b630e-0000-1000-aa40-285d8fd86a0c |
| Kevin | 138efbcb-4807-47fb-b484-22dfb2cc0c60 |

FIG. 3a

*ExternalAccessPermitted()*

| Argument | Direction | Description |
|---|---|---|
| PortMappingProtocol | IN | Protocol of a service to allow remote access |
| InternalIPAddress | IN | local IP address assigned to a service to allow remote access |
| InternalPort | IN | local port no. assigned to a service to allow remote access |
| user_id | IN | Identifier of a user to allow remote access |
| UDN | IN | UDN of a device to allow remote access |
| permission | IN | enable or disable remote access |

FIG. 3b

| User ID (or credential) | Remote Access Enabled Ports |
|---|---|
| Kalen | TCP/192.168.1.22/21 |
| Kalen | TCP/192.168.1.45/9000 |
| Kevin | TCP/192.1.45/21 |

| RA Device's Credential | Remote Access Enabled Devices |
|---|---|
| BnFsdlkgjdghlfS(PDA) | e99b630e-0000-1000-aa40-285d8fd86a0c |
| GkdfgjrEdfkgjsa (Notebook) | 138efbcb-4807-47fb-b484-22dfb2cc0c60 |

| RA Device's Credential | Remote Access Enabled Ports |
|---|---|
| BnFsdlkgjdghlfS(PDA) | TCP/192.168.1.22/21 |
| BnFsdlkgjdghlfS(PDA) | TCP/192.168.1.45/9000 |
| GkdfgjrEdfkgjsa(Notebook) | TCP/192.1.45/21 |

FIG. 5

| RA Device's Credential | User's Credential | Remote Access Enabled Devices |
|---|---|---|
| BnFsdlkgjdghlfS (PDA) | Unc90tuioopxlfS (Kalen) | e99b630e-0000-1000-aa40-285d8fd86a0c |
| GkdfgjrEdfkgjsa (Notebook) | kiXopeaio903nHo (Kevin) | 138efbcb-4807-47fb-b484-22dfb2cc0c60 |
| BnFsdlkgjdghlfS (PDA) | kiXopeaio903nHo (Kevin) | e99b630e-0000-1000-aa40-285d8fd86a0c |

FIG. 6

| Group | Remote Access Enabled Devices |
|---|---|
| Administrator | UDNs of Printer, TV, Desktop, and Air-conditioner |
| User | UDNs of TV and Desktop |
| Guest | UDN of TV |

METHOD AND APPARATUS FOR CONTROLLING OF REMOTE ACCESS TO A LOCAL NETWORK

CROSS-REFERENCE TO RELATED APPLICATIONS

This application is a national stage application of International Application No. PCT/KR2006/001454, filed on Apr. 19, 2006, which claims the benefit of earlier filing date and right of priority to Korean Application No. 10-2005-0128101, filed on Dec. 22, 2005, and Provisional Application No. 60/673,253, filed on Apr. 19, 2005.

TECHNICAL FIELD

The present invention is related to a method and apparatus for enabling remote access to a local network such as a home network.

BACKGROUND ART

As an increasing number of electronic appliances such as video or audio apparatuses or PCs have been used in a home and digital techniques have become dominant in video and audio signal processing, the need for communication among home electronic appliances or communication with other networks is also increasing. In addition, the demand for controlling home electronic appliances through a single apparatus such as a PDA is also increasing.

To meet the demand, home networking technology has emerged for connecting home electronic appliances such as digital TVs or DVD players. The UPnP (Universal Plug and Play) is a key technology required for implementing the home network.

According to the UPnP specification, every home network requires an apparatus, which handles data arbitration among elements (or nodes) connected to the network and assigns addresses to the elements. The apparatus also acts as a gateway to a public network by using a public IP address, e.g., network address of the Internet, thereby enabling home network appliances to communicate with the Internet. The apparatus is called IGD (Internet GateWay Device), which can be a stand-alone device or embedded within another apparatus such as a PC or refrigerator.

Each device connected to a home network, in order for efficient utilization of limited public address resources, uses one of private IP addresses assigned arbitrarily to a home network instead of using a separate public IP address for each device.

Instead of watching particular contents stored in a particular device (e.g., HTTP-based media server) by using a device on a home network, the user of a home network may want to watch contents stored in the media server remotely from outside. However, since each device connected to a home network, for the purpose of efficient utilization of limited public address resources, uses a private IP address assigned arbitrarily to the home network instead of using a separate public IP address for each device, access to the home network from outside is impossible.

One possible method to enable access from outside may be to use an NAT (Network Address Translation) module within IGD for port mapping, thereby providing mapped URLs. The above method brings about inconvenience that separate URLs should be prepared both for access from a device within a home network and from an external device. Since separate URLs are dynamically created and assigned to respective contents managed by a media server, it is infeasible to realize a method for enabling access from outside via mapping by the NAT module.

Another method can use a VPN (Virtual Private Network) client; when a VPN server is installed on a device carrying out a function of a gateway such as IGD and a VPN client is executed from a remote device to establish connection, the remote device is assigned a private IP address belonging to the range of private IP address managed by a gateway device, thereby becoming a virtual device on the home network and being able to make access to a media server with a private IP address. Since the above method, however, allows a remote device to make access to all the devices on a home network via a VPN client, security thereof should be considered.

DISCLOSURE OF THE INVENTION

One objective of the present invention is related to allow remote access to a local network such as a home network, the remote access being restricted to a kind of remote access to a device on a local network satisfying a remote permission condition for the purpose of security of the local network.

One method in accordance with the present invention creates permission information about devices and at the time of access to a device on the local network from outside, searches the created permission information for information of the access and connection information of a target device, thereby determining whether to allow the access in accordance with the search result.

In one embodiment in accordance with the present invention, the device connection information consists of connection protocol information, an IP address, and a port number.

In one embodiment in accordance with the present invention, the permission information is created from a procedure during which a remote access permission action is received from the device and user information and/or device information for remote access and device connection information are extracted from input argument of the received action, thereby being registered as an allowance entry.

In one embodiment in accordance with the present invention, the remote access permission action, as input parameter, has device connection information, user identifying information and/or identifying information of a remotely-accessed, unique identifying information of a device, and a parameter designating remote access permission/refusal.

In one embodiment in accordance with the present invention, the permission information, as input parameter, includes information extracted from an allowed device set action including user identifying information and/or identifying information of a remotely-accessed, unique identifying information of a device, and a parameter designating remote access permission/refusal.

In one embodiment in accordance with the present invention, the allowed device set action is created at a control point and transmitted to IGD.

In one embodiment in accordance with the present invention, the actions are defined in accordance with the specification of Universal Plug & Play (UPnP).

BRIEF DESCRIPTION OF THE DRAWINGS

FIG. 2a illustrates a structure of an action for configuring a remote access enabled device for a user;

FIG. 2b illustrates a list of remote access enabled devices for an individual user created by the action of FIG. 2a;

FIG. 3a illustrates a structure of an action setting connection allowance for a user in accordance with one embodiment of the present invention;

FIG. 3b illustrates a list of connection allowance for an individual user created by the action of FIG. 3a;

FIG. 4a illustrates a list of remote access enabled devices for an individual RA device created in accordance with another embodiment of the present invention;

FIG. 4b illustrates a list of connection allowance for an individual RA device created in accordance with an example of FIG. 4a;

FIG. 5 illustrates a list of remote access enabled devices for an individual RA device/user created in accordance with a further embodiment of the present invention; and FIG. 6 illustrates a list of remote access enabled devices for an individual group created to control remote access according to respective user groups in accordance with a yet another embodiment of the present invention.

BEST MODE FOR CARRYING OUT THE INVENTION

Figure 1:
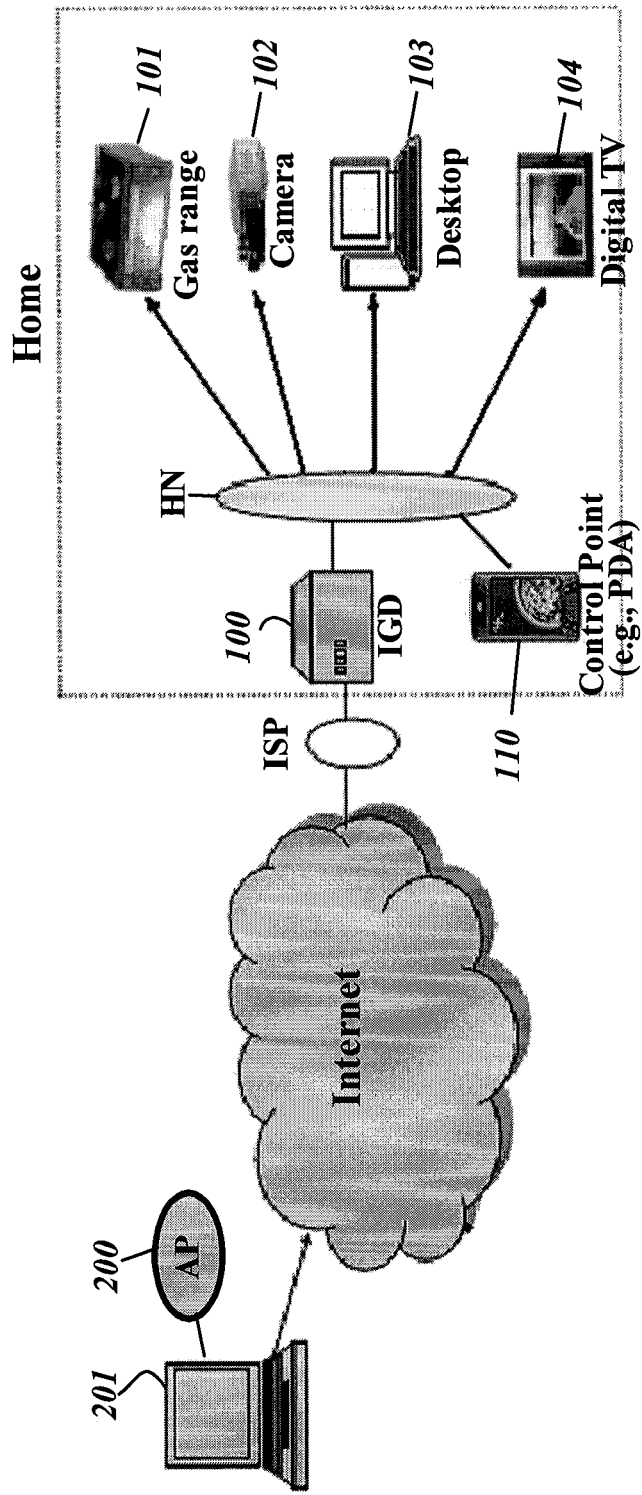
FIG. 1 illustrates a structure of a network in accordance with one embodiment of the present invention.

Hereinafter, according to the present invention, preferred embodiments will be described in detail with reference to appended drawings.

FIG. 1 illustrates a structure of a network in accordance with an embodiment of the present invention.

Hereinafter, a procedure through which one embodiment in accordance with the present invention is carried out on the network of FIG. 1 is described in detail. The present embodiment applies to a case where one of devices 101, 102, 103, 104 comprising a home network (HN) of FIG. 1 can not configure access control for an individual user.

An operator of a home network designates externally accessible devices from among devices connected to the home network to users permitted for remote access by using a control point 110. A control point in the above context is a control application that can inquire/control devices connected to a home network, the control application being executed in a physical device such as a PDA or a notebook. However, for convenience' sake, a device where the control application is run is called a control point.

When an operator designates a particular device as 'externally accessible' for a particular user by using the control point 110, the control point 110 invokes an action configuring the above on IGD 100. At this time, necessitated information to designate as 'externally accessible' is transferred as input argument of an action.

Beyond a function of remote access management in accordance with the present invention that will be described below, the IGD 100 also carries out conventional functions of data arbitration among devices connected to a local home network, configuration/management of network addresses, and a gateway to an external network, description thereupon being omitted due to not having direct relevance to the present invention.

An action that the control point 110 calls on the IGD 100 can have a structure of FIG. 2a.

Input argument of ConfigureExternalAccessPermission( ) action of FIG. 2a consists of user_id, UDN, and permission; user_id is identifier of a user (which can be user ID or a credential assigned to a user). UDN (Unique Device Name) is a unique identifier of a device designated as 'externally accessible'. Finally, permission is a parameter designating permission/refusal of external access.

In another embodiment of the present invention, instead of a user identifier, an identifier of a remotely-accessed (hereinafter, it is referred to as 'RA device'.) can be used. An identifier of an RA device can be UDN, a user-friendly unique device name (which is described below in detail), or a credential assigned to an RA device. A credential of an RA device can be configured for a device to be remotely accessed by a user directly on the IGD 100 or through a control point. Necessarily, as for devices that do not allow remote access, identifying information of an RA device may not be configured.

In a further embodiment of the present invention, user identifier and RA device can be set together. In the present embodiment, a device on a home network to be accessed can be differed depending on which RA device is used for remote access by the user.

Through the action, according to the user (and/or RA device being used), remotely accessible devices can be selectively filtered.

The ConfigureExternalAccessPermission( ) action assumes that the home network is operated based on UPnP; however, the present invention dose not necessarily impose UPnP as a necessary condition. If basic principles of the present invention described below could be applied adaptively to a standard in a different specification, network security effect identical to that of the present invention would be obtained. Accordingly, the present invention is not limited to terms and formats of actions in accordance with UPnP network and accompanying standard.

When an operator specifies a device and a user for external access through the control point 110, the control point 110 puts information according to the designation into input argument and configures an action in the format as shown in FIG. 2a, the action being transferred to the IGD 100. Among the transferred information, UDN is not the information that an operator manually enters; when an operator chooses a device from among a device list displayed in a readily perceivable graphic form (e.g., icons representing 101, 102, 103, 104 of FIG. 1), a previously identified UDN is used as input argument, the UDN being identified from information contained in Device & Service Descriptor received from the device when the device is discovered on a home network for the first time. In another embodiment in accordance with the present invention, instead of UDN, 'user-friendly unique device name' can be used. A user-friendly unique device name can be a character string entered (or chosen) by the user such as "common PDA", "TVinLivingRoom" or "TVinBedRoom", product code of the device, model number (S/N), and/or a name combined with UDN. The combined name is seen by the user as an input character string, whereas a product code, model number, UDN, or a combination thereof is used when a particular device is designated among devices. A 'user-friendly unique device name' can be set for a device when the device is installed on a home network for the first time.

When the ConfigureExternalAccessPermission( ) action is received and permission parameter within the action is 'enable', the IGD 100 creates an entry of a list of remote access enabled devices from user_id and UDN (or 'user-friendly unique device name') contained in the input argument. When 'user-friendly unique device name' is received, the IGD 100 separates 'character string' from its associated product code, model number, UDN, or combination thereof, thereby 'user-friendly unique device name' being managed as a single entry of a device table.

FIG. 2b illustrates an example of a list of remote access enabled devices for an individual user created by the IGD 100 following the above method. Two entries illustrated in FIG.

2*b* are created respectively by the following two actions, each of which has UDN invoked by the control point 100 as input argument.

ConfigureExternalAccessPermission(Kalen, e99b630e-0000-1000-aa40-285d8fd86a0c, enable), ConfigureExternalAccessPermission(Kevin, 138efbcb-4807-47fb-b484-22dfb2 cc0c60, enable), A request for activation of a remote access to devices capable of designating remote access allowance among devices 101, 102, 103, 104 connected to the home network is made. The request is configured by an operator of the home network or by the user who makes a remote access to the device through an input means of the corresponding device. The configuration information (remote_access_permitted=active (or inactive)) is stored in the corresponding device. In another embodiment in accordance with the present invention, the value of the configuration information (remote_access_permitted) is set by using the control point 110.

As described above, a device, wherein information about whether to allow a remote access (remote_access_permitted) is set to 'permitted', invokes a remote access permission action on the IGD 100 when the device opens a socket. The remote access permission action can have a structure as shown in FIG. 3*a*.

PortMappingProtocol, InternalIPAddress, and InternalPort, which are input arguments of ExternalAccessPermitted( ) action of FIG. 3*a*, comprise connection information about internal service of a device that invokes the action (or connection information about device itself), the device to be allowed for external access; the connection information can be static or dynamically allocated at the time of socket creation. UDN is a unique identifier of a device itself designated for external access and 'permission' is a parameter designating external access permission/refusal. 'permission' carries a value designated by previously set information (remote_access_permitted). (e.g., 'enable' when active, whereas 'disable' when inactive)

user_id is a parameter intended to carry an identifier (or credential) of the user; since the present embodiment dose not support a device's selective permission/refusal of an access for an individual user, 'NULL' is recorded in the 'user_id' parameter.

In order to invoke remote access permission action described as above, the corresponding device can be equipped with a control point with restricted functions that can find the IGD 100 and invoke a subsequent action at the time of the initial connection to the home network.

The IGD 100 that received the remote access permission action interprets the action and input argument of the action, thereby creating entries of a list of remote access enabled ports for an individual user as shown in FIG. 3*b* with reference to a previously set list of remote access enabled devices for an individual user as shown in FIG. 2*b*

A second entry 301 from among three entries of a list shown in FIG. 3*b* has been created from an action in the following.

ExternalAccessPermitted(TCP,192.168.1.45,9000, NULL, e99b630e-0000-1000-aa40-285d8fd86a0c,enable)

If an identifier of a connection allowed user in a received ExternalAccessPermitted( ) action is not registered in a list of remote access enabled devices for an individual user as shown in FIG. 2*b*, or even if registered, when UDN of an enabled device and UDN included in an input argument within the action are not the same, the IGD 100 does not create entries for remote access enabled ports in a list of FIG. 3*b*, responding to the received ExternalAccessPermitted( ) action with an error. At this time, a value indicating the type of the error (unregistered user, disagreement of enabled devices, etc.) may be delivered as an output parameter to a device that invoked an action.

An entry of a list of remote access enabled ports for an individual user created as shown in FIG. 3*b* is removed from the list, when an action of ExternalAccessPermitted(,,,,,disable)(permission=disable) is received and the entry has information contained in the input argument (port information, identifier of an allowed user corresponding to UDN).

When

ConfigureExternalAccessPermission(,,disable) (permission=disable) action is received from the control point 110, the IGD 100 removes an entry that has information contained in the input argument (user identifier (ID, credential), UDN) from a list of remote access enabled devices for an individual user having a structure as shown in FIG. 2*b*. The IGD 100, from a list of FIG. 3*b*, also deletes an identifier that is the same as the deleted identifier (ID, credential) and an entry that has connection information assigned to a device of the deleted UDN or connection information belonging to a range of connection information.

Hereinafter, another embodiment in accordance with the present invention is described in detail, which is about a device from among devices connected to a home network 101, 102, 103, 104, the device being able to set users allowed for remote access from outside.

In the present embodiment, when a device that can set whether to allow a remote access from among devices connected to the home network 101, 102, 103, 104 is configured for remote access activation/inactivation, an identifier of a user for whom a remote access to the device is allowed is also set. An operator of the home network or user who makes a remote access to the device sets the above configuration by using an input means of the corresponding device, the configuration information (remote_access-permitted/user_identification=active, or inactive/user identifier) being stored in the corresponding device. In another embodiment in accordance with the present invention, the configuration information (remote_access-permitted/user_identification) can be set on the corresponding device by using the control point 110.

A device, where information about whether to allow a remote access for a user is set as above, invokes a remote access permission action on the IGD 100 when the device opens a socket.

Although the remote access permission action can have a structure of ExternalAccessPermitted( ) action as shown in FIG. 3*a*, at the time of calling the action, information of user_identification field within the configuration information (remote_access-permitted/user_identification) is necessarily contained in user_id parameter within the action.

The IGD 100 which receives the remote access permission action checks the action and information of the action's input argument; when user information and permission information about a device turn out to be identical to an entry on a list of remote access enabled devices for an individual user configured as shown in FIG. 2*b*, the IGD 100 creates entries of a list of remote access enabled ports for an individual user having a structure as shown in FIG. 3*b*.

If an action of ExternalAccessPermitted(,,,,,disable) is received, an entry of a list of remote access enabled ports for an individual user created as shown in FIG. 3*b* is deleted from the list when the entry has the same information as the information contained in the input arguments (port information, user identifier).

In the embodiments described above, when user_id parameter of ExternalAccessPermitted( ) action from an arbitrary device, where input argument permission is enable, contains a particular identifier, e.g., '*', the IGD 100, at the time of creating entries of a list of remote access enabled ports for an individual user as shown in FIG. 3b, dose not record information about user field (Users), leaving the information in blank. Leaving user field in blank is to avoid checking user identifier when a decision is made on whether to allow an access to an internal home network. Therefore, for this case, every user can make an access from outside to a device that invokes a corresponding action.

Hereinafter, in accordance with an embodiment of the present invention as described above, under the condition that a list of remote access enabled ports for an individual user having a structure of FIG. 3b is set in the IGD 100, a procedure is described, where a selective access to a device on the home network is made remotely.

A user at a remote place possesses a device that can connect to the Internet, e.g., a notebook 201 and an application program 200 which can connect to a device on the home network is installed on the notebook 201. In addition, a public IP address is assigned to the notebook 201 for connecting to the Internet; either a user is informed of a public IP address of the IGD 100 which is a gateway device for a home network of the user or a public IP address is already set on the application program 200. A public IP address assigned to the IGD 100 from an Internet service provider (ISP) can be a dynamically assigned temporary IP address rather than a fixed address; in this case, too, an IP address assigned to the IGD 100 is obtained through an appropriate procedure or method. Since the procedure or method dose not have a direct relationship to the present invention, description thereupon is omitted.

When a VPN client is executed on the notebook 201, since one of private IP addresses assignable to the home network is allocated from the IGD 100, the application program 200 can communicate with devices connected to a home network as if connected to a home network based on a VPN client. When communicating based on VPN, the IGD 100 obtains an identifier of a connected user through an authentication procedure for the user who executed a VPN client. If not the case of communicating with the IGD 100 based on VPN, user authentication procedure is carried out by connecting to the IGD 100 after the application program 200 is executed.

In the previous embodiment, user authentication can be carried out by a credential assigned previously to the user. (the credential is also stored in the IGD 100.) For example, separate credentials are given to respective users of the home network and are stored in portable devices, e.g., removable USB memories; a USB memory is attached to the notebook 201 and by activating an appropriate home network connection program, authentication can be carried out based on the degree of coincidence of credentials between a connection program and the IGD 100 without intervention of a user.

In another embodiment in accordance with the present invention, as described above, home network devices enabled for a remote access can be different according to RA devices. FIG. 4a illustrates a list of remote access enabled devices for an individual RA device created in accordance with the present embodiment. As shown in FIG. 4a, a credential 401 of an RA device is associated with UDN of a home network device enabled for a remote access. Although one-to-one permission entry is illustrated in the example of FIG. 4a, multiple UDNs can be associated with a credential of a single RA device. The aforementioned case happens when a credential of an RA device is set to multiple devices on a home-network. According to the present embodiment, a list of remote access enabled devices for an individual RA device is created in terms of credentials assigned to RA devices as shown in FIG. 4b instead of using user identifiers. In a further embodiment in accordance with the present invention, when the IGD 100 manages a table associating user-friendly unique device names of RA devices with credentials assigned to the corresponding devices, user-friendly unique device names can be set instead of entering credentials about RA devices allowing remote access to devices on a home network. In the present embodiment, when a user-friendly unique device name is carried by ConfigureExternalAccessPermission( ) action, the IGD 100 extracts a credential associated with the user-friendly unique device name from the table and configures entries of a list of remote access enabled devices for an individual RA device as shown in FIG. 4a.

In a further embodiment in accordance with the present invention, as described above, a different set of home network devices to be accessed can be configured according to respective RA devices and users. FIG. 5 illustrates a list of remote access enabled devices for an individual RA device/user created in accordance with the present embodiment. As shown in FIG. 5, a pair of credentials for an RA device and a user is associated with UDN of a home network device enabled for remote access and each entry is created by information extracted from input argument of a received action ConfigureExternalAccessPermission( ). In the present embodiment, remote access is allowed when information about two credentials for an RA device and a user agrees with a credential accompanying a remote access. Therefore, even for a user who is allowed for a remote access, remote access is allowed only when the user uses an RA device where a remote access is allowed for the user. In the example of FIG. 5, when 'Kalen' tries to access a device having UDN of e99b630e-0000-1000-aa40-285d8fd86a0c, e.g., a desktop PC 103 by using a notebook, remote access is not allowed.

According to the embodiment of FIG. 5, when both a credential for each user and a credential for each RA device are utilized, with a user credential encrypted to a device credential assigned (or stored) to an RA device 201 for remote access and thus provided to the IGD 100, both the credentials can be utilized at the same time for remote access authentication.

After user authentication (and/or RA device authentication), a device is selected from a selection menu of a device connected to an internal home network provided by the IGD 100 or a device to be accessed is selected from information about devices pre-registered on the application program 200 (or from a device list information created from a response message which is received from a result of transmitting a search message to the home network). Since a socket is created in the device according to the selection, according to the method described above, entries of a list of remote access enabled devices for an individual user as shown in FIG. 3b are recorded. Afterwards, a message requested on the same device places connection information of a device to be connected in a lower address of a destination and adds a public IP address of the IGD 100 at the upper address thereof. The IGD 100 identifies connection information of a device supposed to be a final destination (protocol, local IP address, and IP port) after removing IP header at the front through address conversion process; and in a list of remote access enabled ports having a structure as shown in FIG. 3b (or FIG. 4b), checks the identified information and user identifying information (ID or credential) (and/or credential of an RA device) identified through previous authentication process for a current connection.

If an entry of a list of remote access enabled ports coincides both with a user identifier (or user credential) (and/or credential of an RA device) and connection information (for those entries whose user fields (or device fields) are left in blank, if only an entry coincides with connection information), a received message is relayed to the home network and transferred to a device of the corresponding destination by the IGD 100. When a coinciding entry dose not exists, access to the corresponding device is not made by not relaying a received message to the home network.

In another embodiment in accordance with the present invention, remote access is controlled according to a user group. In the present embodiment, a list of devices to be remotely accessed according to a user group is set in the IGD 100 as shown in FIG. 6. In addition, for each group where an individual user of a home network belongs, a list of entries where user identifiers and a group name are associated with each other is also set to the IGD 100. The above setting can necessarily be realized by the control point 110.

Under the condition as described above, when ExternalAccessPermitted( ) action is received from an arbitrary device on a home network, the IGD 100 extracts user identifier of the action, checks a group name where the user belongs from a previously created list, and determines whether to allow by comparing information about device(s) enabled for remote access for the group with device identifying information carried by the action, e.g., UDN. When remote access is allowed, as described above, entries of a list of remote access enabled ports for an individual user as shown in FIG. 3b is created. Controlling of remote access afterwards is carried out in the same way as described in the above embodiment.

In another embodiment in accordance with the present invention, the ExternalAccessPermitted( ) action can provide a configured group name as input argument instead of a user identifier.

In a further embodiment in accordance with the present invention, the ExternalAccessPermitted( ) action can be used without a user identifier. If the action is received and a UDN included in the action, from among a list of remote access enabled devices for an individual group as shown in FIG. 6, corresponds to a UDN permitted for a group name found from the user identifier-group name table based on user identifier checked during authentication process for remote access, the IGD 100 creates entries of a list of remote access enabled ports for an individual user as shown in FIG. 3b. Controlling of remote access afterwards is carried out in the same way as described in the above embodiment.

In the embodiments described so far, remote access is controlled by the IGD 100 which is a gateway device to a home network.

In another embodiment in accordance with the present invention, remote access can be controlled by a communication module (hardware or software carrying out a given communication function) added for communications with broadband network beyond the IGD 100. For example, SSDP proxy handling SSDP message of UPnP (Discovery, NOTIFY message) can control a remote access. As a way of controlling a remote access, when NOTIFY message is returned as a proxy response to Discovery message from an RA device, only a list of devices on a home network to which the RA device can make an access with reference to a list of remote access enabled devices set in the IGD 100 is returned. Since devices on a home network except for allowed devices are invisible to an RA device, remote access to other devices cannot be carried out.

The present invention described in detail with a limited number of embodiments above, while maintaining security of the entire home network, allows a remote access from outside of a home network for a particular device connected to the home network for each user; therefore, at least one effect is obtained such that user convenience and network security are satisfied at the same time.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for managing remote access to a device connected to a local network, the method comprising:
   instructing a network managing device to create permission information regarding at least one local device connected to the local network,
   wherein the permission information is for determining whether the at least one local device can be accessed from a remote device not included in the local network, and
   wherein the permission information includes at least an identifier of a user, a unique identifier for the at least one local device, a parameter designating either permission or refusal of external access of the at least one local device or connection information for connecting to the at least one local device; and
   instructing the network managing device to search the created permission information for first permission information regarding a first device of the at least one local device when a request for access to the first device is received by the network managing device from the remote device,
   wherein the network managing device determines whether to allow the access to the first device according to the first permission information, and
   wherein the remote device is connected with the first device using the connection information upon determining to allow the access to the first device.

2. The method of claim 1, wherein the connection information includes connection protocol information, an IP address, and a port number.

3. The method of claim 1, wherein instructing the network managing device to create the permission information comprises:
   transmitting a first command to the network managing device to create a list of remote access enabled devices or setting at least a user or a remotely-accessed device to allowance, the first command including at least the identifier of the user, the unique identifier for the at least one local device or information regarding the remotely-accessed device; and
   transmitting a second command allowing remote access for the at least one local device, wherein the second command includes the unique identifier for the at least one local device and instructs the network managing device to search the list of remote access enabled devices for the unique identifier for the at least one local device and to obtain at least the identifier of the user or information regarding a remotely-accessed device associated with the unique identifier for the at least one local device.

4. The method of claim 3, wherein the first command and the second command each further comprises a parameter indicating remote access permission or remote access refusal.

5. An apparatus for managing remote access to a device connected to a local network, the apparatus comprising:

a microprocessor configured to:
  instruct a network managing device to create permission information regarding at least one local device connected to the local network, wherein the permission information is for determining whether the at least one local device can be accessed from a remote device not included in the local network, and wherein the permission information includes at least an identifier of a user, a unique identifier for the at least one local device, a parameter designating either permission or refusal of external access of the at least one local device or connection information for connecting to the at least one local device; and
  instruct the network managing device to search the created permission information for first permission information regarding a first device of the at least one local device when a request for access to the first device is received by the network managing device from the remote device,
  wherein the network managing device determines whether to allow the access to the first device according to the first permission information, and
  wherein the remote device is connected with the first device using the connection information upon determining to allow the access to the first device.

6. The apparatus of claim 5, wherein the connection information includes connection protocol information, an IP address, and a port number.

7. The apparatus of claim 5, wherein the microprocessor is further configured to:
  transmit a first command to the network managing device to create a list of remote access enabled devices for setting at least a user or a remotely-accessed device to allowance, the first command including at least the identifier of the user, the unique identifier for the at least one local device or information regarding the remotely-accessed device; and
  transmit a second command allowing remote access for the at least one local device, wherein the second command includes the unique identifier for the at least one local device and instructs the network managing device to search the list of remote access enabled devices for the unique identifier for the at least one local device and to obtain at least the identifier of the user or information regarding a remotely-accessed device associated with the unique identifier for the at least one local device.

8. The apparatus of claim 7, wherein the first command and the second command each further comprises a parameter indicative of remote access permission or remote access refusal.

9. A method for managing remote access to a device connected to a local network, the method comprising:
  receiving a request for getting remote access permission information regarding at least one local device; and
  transmitting a remote access permission message to a network managing device,
  wherein the remote access permission message comprises at least an identifier of a user, a unique identifier for the at least one local device, a parameter designating either permission or refusal of external access of the at least one local device or connection information,
  wherein permission information regarding at least one local device is created by the network managing device using the remote access permission message, and
  wherein the permission information regarding the at least one local device is for determining whether the at least one local device can be accessed from a remote device not included in the local network.

10. The method of claim 9, wherein the connection information includes connection protocol information, an IP address, and a port number.

11. The method of claim 9, wherein the remote device is connected with the at least one local device using the permission information upon determining the at least one local device can be accessed.

12. An apparatus connected to a local network, the apparatus comprising:
  a control device configured to:
  receive a request for getting remote access permission information regarding at least one local device; and
  transmit a remote access permission message to a network managing device,
  wherein the remote access permission message comprises at least an identifier of a user, a unique identifier for the at least one local device, a parameter designating either permission or refusal of external access of the at least one local device or connection information,
  wherein permission information regarding at least one local device is created by the network managing device using the remote access permission message, and
  wherein the permission information regarding the at least one local device is for determining whether the at least one local device can be accessed from a remote device not included in the local network.

13. The apparatus of claim 12, wherein the connection information includes connection protocol information, an IP address, and a port number.

14. The apparatus of claim 12, wherein the remote device is connected with the at least one local device using the permission information upon determining the at least one local device can be accessed.

* * * * *